United States Patent [19]

Hunter

[11] 4,425,453
[45] Jan. 10, 1984

[54] ASPHALTIC COMPOSITIONS CONTAINING ALKOXYLATED TERPOLYMERS

[75] Inventor: Walter D. Hunter, Houston, Tex.

[73] Assignee: Texaco Development Corp., White Plains, N.Y.

[21] Appl. No.: 380,636

[22] Filed: May 21, 1982

[51] Int. Cl.$^3$ .............................................. C08L 31/00
[52] U.S. Cl. ...................................... 524/69; 524/59; 525/385; 106/273 R
[58] Field of Search .................... 524/59, 64, 75, 77, 524/69, 68; 525/383, 385; 526/320; 106/273 R, 276, 278, DIG. 7, 284

[56] References Cited

U.S. PATENT DOCUMENTS

| | | | |
|---|---|---|---|
| 3,177,164 | 4/1965 | Mills et al. | 524/69 |
| 3,268,463 | 8/1966 | McArinch et al. | 524/69 |
| 3,821,144 | 6/1974 | Goyer et al. | 524/69 |
| 3,900,439 | 8/1975 | Kay | 524/69 |
| 3,985,694 | 10/1976 | Petrucio et al. | 524/68 |
| 4,105,612 | 8/1978 | Cushman et al. | 524/69 |
| 4,358,554 | 11/1982 | Yan et al. | 524/69 |

*Primary Examiner*—Josephine Barr
*Attorney, Agent, or Firm*—Jack H. Park; Walter D. Hunter; Richard A. Morgan

[57] ABSTRACT

Asphaltic compositions having improved elastic properties and improved adhesion to aggregate particles as well as a high degree of resistance to stripping action are provided which comprise a major amount of asphalt and a minor amount of terpolymer of ethylene, vinyl acetate or vinyl chloride and an organic acid alkoxylated with about 1 to about 10 weight percent of an alkylene oxide. Optionally, the composition may contain a minor amount of a synthetic terpenic resin.

18 Claims, No Drawings

4,425,453

ASPHALTIC COMPOSITIONS CONTAINING ALKOXYLATED TERPOLYMERS

BACKGROUND OF THE INVENTION

1. Field of the Invention

This invention relates to asphaltic compositions which exhibit improved elastic properties as well as improved adhesion to aggregate particles. More particularly, this invention relates to compositions comprising a major amount of asphalt, a minor amount of an alkoxylated terpolymer and, optionally, a small amount of a synthetic terpenic resin.

2. Description of the Prior Art

A wide variety of polymers have been added to asphaltic compositions in order to improve the elasticity of these compositions and to improve the adhesion of the asphalt to aggregate particles. For example, in U.S. Pat. No. 3,422,841 compositions consisting of a major amount of asphalt and a minor amount of an ethylene-vinyl acetate copolymer have been disclosed in the U.S. Pat. No. 3,821,144 compositions comprising asphalt, a synthetic terpenic resin and a copolymer of ethylene and vinyl acetate are described and in U.S. Pat. No. 3,985,694 compositions are mentioned which comprise asphalt, a minor amount of a synthetic resin and a terpolymer of ethylene, vinyl acetate and an organic acid such as acrylic acid.

Although all the compositions mentioned above exhibit some improvement with regard to elasticity and/or adhesion to aggregate particles there is a need in the art for asphaltic compositions which are highly elastic and which at the same time possess superior adhesive properties.

SUMMARY OF THE INVENTION

This invention relates to asphaltic compositions comprising (1) a major amount of asphalt, (2) a minor amount of a terpolymer of ethylene, vinyl acetate or vinyl chloride and an organic acid wherein the terpolymer is alkoxylated with, i.e., reacted with, from about 1 to about 10 weight percent of a material selected from the group consisting of propylene oxide and a mixture of propylene oxide and ethylene oxide and (3) optionally a minor amount of synthetic terpenic resin.

In another aspect this invention relates to the alkoxylated terpolymer compositions previously described.

DETAILED DESCRIPTION OF THE INVENTION

The asphaltic compositions of this invention are useful in a wide variety applications in view of their improved elasticity, durability, highly satisfactory adhesive properties, etc.

Generally, the improved compositions of this invention comprise from about 60 to about 93 weight percent of asphalt and from about 7 to about 40 weight percent of the terpolymer of ethylene, vinyl acetate or vinyl chloride and an organic acid alkoxylated with from about 1 to about 10 weight percent or more of a material selected from the group consisting of propylene oxide and a mixture of propylene oxide and ethylene oxide wherein the weight percent of propylene oxide in the said mixture is from about 65 to about 95.

The synthetic terpenic resins employed in the novel asphaltic compositions of the present invention, are resins derived from terpenic raw materials such as turpentine, pine oil, and related materials. The principal constituent of turpentine is a terpene or pinene. While the principal constituent of pine oil is a mixture of terpene alcohols (largely alpha terpineol) with small amounts of terpene hydrocarbons and others. The pine oil, for this purpose, is obtained by steamed-distillation of pinewood. In addition to the recovery of pine oil and turpentine as employed in the aforementioned process, other terpene hydrocarbons such as limonene, dipentene, terpinene and terpinolene are also obtained as intermediate fractions.

The principal methods for producing resinous materials from the aforementioned substances are by oxidation or by polymerization. In this respect, it is found that turpentine tends to resinify during storage, probably because of oxidation. The evaporation of turpentine and pine oils in open vessels yields resinous materials as a result of oxidation and polymerization. A more complete description of the aforementioned synthetic terpenic resins, as employed in the novel asphaltic compositions of the present invention is found in "The Chemistry of Synthetic Resins," by Carleton Ellis, Vol. I, Rheinhold Publishing Corporation, New York, N.Y., 1935.

The synthetic terpenic resin, employed in the novel asphaltic compositions of the present invention, preferably has a softening point (Ring and Ball) from about 50° to about 200° C. Still more particularly preferred are synthetic resins having a softening point (Ring and Ball) from about 95° to about 105° C. and a density at 25° C. of about 0.93.

A number of different types of asphalt may be utilized in preparing the compositions of this invention. Preferably, the asphalt employed will have a softening point (Ring and Ball) from about 40° to about 210° C. Particularly preferred are asphalts with softening points of from about 40° to about 60° C.

The terpolymers of the asphaltic compositions of this invention contain at least about 75 weight percent ethylene, at least about 5 weight percent vinyl acetate or vinyl chloride and from about 0.50 to about 4 weight percent of the organic acid. Although a wide variety of organic acids may be employed in the terpolymers previously described the preferred organic acids are acrylic, methacrylic and itaconic acids. The terpolymers of this invention can be prepared by methods well known in the art. For example, the preparation of such terpolymers can be accomplished by the process more fully disclosed in U.S. Pat. No. 3,215,657 which is incorporated herein in its entirety by reference.

The number average molecular weight of the terpolymers employed in preparing the alkoxylated terpolymers used in the asphaltic compositions of this invention will vary from about 10,000 to about 550,000 or more and, preferably, will be from about 30,000 to about 110,000.

The alkoxylation of the terpolymers can be conveniently conducted using methods well known in the art. For example, a solution comprising about 10 to about 30 weight percent or more of the terpolymer of ethylene, vinyl acetate or vinyl chloride and the organic acid in a suitable solvent such as toluene, xylene, etc. along with about 0.5 weight percent or more of powdered potassium hydroxide or sodium hydroxide is charged to an autoclave and the autoclave and contents heated to a temperature of about 125° to about 200° C. after which the required weight of propylene oxide or a mixture of propylene oxide and ethylene oxide is pressured with nitrogen into the autoclave over a period of 1 to 3 hours or more following which the autoclave is allowed to cool to room temperature and then vented. The reaction product remaining is then stripped to remove volatile materials yielding the alkoxylated terpolymer.

The following example which illustrates the preparation of the alkoxylated terpolymers is to be considered not limitative.

EXAMPLE I

A total of 950 cc of toluene, 5 g. of powdered potassium hydroxide and 200 g. of a terpolymer of an ethylene vinyl acetate-acrylic acid terpolymer consisting of about 81 weight percent ethylene, about 15.5 weight percent of vinyl chloride and with the balance being acrylic acid and having a number average molecular weight of about 50,000 are added to a stirrer-equipped autoclave which is then heated to a temperature of 140° C. Propylene oxide in the amount of 6.2 g is added to the autoclave under nitrogen pressure over a 0.5 hour period during which time the temperature of the autoclave is maintained at 130° C. Next, the autoclave and contents are allowed to cool to room temperature after which the autoclave is vented. The reaction mixture is then stripped of volatiles using a nitrogen purge. The resulting product is the ethylene-vinyl chloride-acrylic acid terpolymer alkoxylated with about 3 weight percent of propylene oxide.

The following example which illustrates the preparation of the asphaltic compositions of this invention is to be considered not limitative.

EXAMPLE II

An asphaltic composition of this invention is prepared by first melting 150 gm. of pure asphalt having a softening point (Ring and Ball) of about 60° C. and then adding to the molten asphalt with mixing (a) 40 gm. of ethylene-vinyl acetate-acrylic acid terpolymer consisting of 76.1 weight percent ethylene, about 20.2 weight percent vinyl chloride and with the balance being acrylic acid, alkoxylated with 4.1 weight percent of propylene oxide prepared as described above and (b) 10 gm of a synthetic terpenic resin having a softening point of about 100° C. (Ring and Ball) and a density at 25° C. of about 0.92 which is obtained by the catalytic polymerization of alpha and beta pinenes occuring in turpentine.

The above mentioned asphalt composition, after being heated to about 375° F., is employed in coating river paving aggregate gravel that has been previously heated to about 270° F. The aggregate and binder are quickly and thoroughly mixed so that in the resulting mixture there is a uniform distribution of asphalt binder throughout.

Portions of the aggregate coated with the asphaltic composition of this invention are tested under various water immersion conditions and found to exhibit excellent resistance to stripping when immersed in water at elevated temperatures. These asphaltic compositions also exhibit good elasticity.

What is claimed is:

1. A composition comprising about 60 to about 93 weight percent of asphalt and from about 7 to about 40 weight percent of a terpolymer of ethylene, vinyl acetate or vinyl chloride and an organic acid selected from the group consisting of acrylic, methacrylic and itaconic acids alkoxylated with from about 1 to about 10 weight percent of a material selected from the group consisting of propylene oxide and a mixture of propylene oxide and ethylene oxide wherein the weight percent of propylene oxide in the said mixture is from about 65 to about 95.

2. The composition of claim 1 wherein the said asphalt has a softening point (Ring and Ball) from about 50° to 200° C.

3. The composition of claim 1 wherein the said terpolymer contains at least 60 weight percent ethylene, at least 5 weight percent vinyl acetate and from about 0.50 to about 4 weight percent of the said organic acid.

4. The composition of claim 1 wherein the said organic acid is acrylic acid.

5. The composition of claim 1 wherein the said organic acid is methacrylic acid.

6. The composition of claim 1 wherein the said terpolymer is a terpolymer of ethylene, vinyl acetate and acrylic acid.

7. The composition of claim 1 wherein the said terpolymer is a terpolymer of ethylene, vinyl chloride and acrylic acid.

8. The composition of claim 1 wherein the said terpolymer has a number storage molecular weight of about 10,000 to about 550,000.

9. The composition of claim 1 wherein the said terpolymer has a number average molecular weight of about 30,000 to about 110,000.

10. The composition of claim 1 wherein the said material is propylene oxide.

11. A composition comprising about 55 to about 93 weight percent of asphalt, about 1 to about 20 weight percent of a synthetic terpenic resin, and from about 6 to about 40 weight percent of a terpolymer of ethylene, vinyl acetate or vinyl chloride and an organic acid selected from the group consisting of acrylic, methacrylic and itaconic acids, alkoxylated with from about 1 to about 10 percent by weight of a material selected from the group consisting of propylene oxide and a mixture of propylene oxide and ethylene oxide wherein the weight percent of propylene oxide in the said mixture is from about 65 to about 95.

12. The composition of claim 11 wherein the said asphalt has a softening point (Ring and Ball) from 50° to 200° C.

13. The composition of claim 11 wherein the said terpolymer contains at least 60 weight percent ethylene, at least 5 weight percent vinyl acetate and from 0.50 to about 4 weight percent of the said organic acid.

14. The composition of claim 11 wherein the said organic acid is acrylic acid.

15. The composition of claim 11 wherein the said organic acid is methacrylic acid.

16. The composition of claim 11 wherein the said material is propylene oxide.

17. The composition of claim 11 wherein the number average molecular weight of the said terpolymer is from about 10,000 to about 550,000.

18. The composition of claim 11 wherein the number average molecular weight of the said terpolymer is from about 30,000 to about 110,000.

* * * * *

UNITED STATES PATENT AND TRADEMARK OFFICE
CERTIFICATE OF CORRECTION

PATENT NO. : 4,425,453
DATED : January 10, 1984
INVENTOR(S) : Walter D. Hunter

It is certified that error appears in the above—identified patent and that said Letters Patent are hereby corrected as shown below:

Claim 8, line 2, delete "storage" and insert therefor --average--.

Signed and Sealed this

Tenth Day of April 1984

[SEAL]

Attest:

GERALD J. MOSSINGHOFF

Attesting Officer

Commissioner of Patents and Trademarks